United States Patent
Raynaud et al.

(10) Patent No.: US 9,171,352 B1
(45) Date of Patent: Oct. 27, 2015

(54) AUTOMATIC PROCESSING OF IMAGES

(71) Applicant: Google Inc., Mountain View, CA (US)

(72) Inventors: Daniel Paul Raynaud, Cupertino, CA (US); Boris Bluntschli, Canton of Zurich (CH); Daniel Cotting, Aargau (CH)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 14/560,094

(22) Filed: Dec. 4, 2014

(51) Int. Cl.
*G06T 5/00* (2006.01)
*G06K 9/62* (2006.01)
*G06K 9/00* (2006.01)

(52) U.S. Cl.
CPC .............. *G06T 5/00* (2013.01); *G06K 9/00536* (2013.01); *G06K 9/6218* (2013.01); *G06T 5/009* (2013.01)

(58) Field of Classification Search
CPC .............................. G06T 5/009; G06K 9/6218
See application file for complete search history.

(56) References Cited

U.S. PATENT DOCUMENTS

| | | | |
|---|---|---|---|
| 6,658,139 B1* | 12/2003 | Cookingham et al. | 382/112 |
| 7,092,573 B2 | 8/2006 | Luo et al. | |
| 7,359,572 B2* | 4/2008 | Liu et al. | 382/274 |
| 7,412,105 B2* | 8/2008 | Wilensky | 382/254 |
| 7,444,038 B2* | 10/2008 | Shimizu et al. | 382/311 |
| 7,813,526 B1 | 10/2010 | Bourdev | |
| 8,036,460 B2* | 10/2011 | Nanu et al. | 382/167 |
| 8,111,923 B2 | 2/2012 | Csurka et al. | |
| 8,224,072 B2 | 7/2012 | Porikli et al. | |
| 8,340,452 B2* | 12/2012 | Marchesotti | 382/254 |
| 8,458,174 B1 | 6/2013 | Duerig | |
| 8,520,967 B2* | 8/2013 | Bilcu et al. | 382/254 |
| 8,532,434 B2 | 9/2013 | Morimoto | |
| 8,755,623 B2 | 6/2014 | Du | |
| 2002/0172419 A1 | 11/2002 | Lin et al. | |
| 2003/0059123 A1* | 3/2003 | Omori | 382/254 |
| 2006/0110011 A1* | 5/2006 | Cohen et al. | 382/115 |
| 2007/0140578 A1* | 6/2007 | Okutsu | 382/254 |
| 2008/0317358 A1* | 12/2008 | Bressan et al. | 382/224 |
| 2010/0014776 A1* | 1/2010 | Marchesotti | 382/275 |
| 2012/0213420 A1* | 8/2012 | Steiner | 382/118 |
| 2012/0314971 A1* | 12/2012 | Yuan et al. | 382/274 |
| 2013/0170738 A1* | 7/2013 | Capuozzo et al. | 382/159 |
| 2013/0176442 A1* | 7/2013 | Shuster et al. | 348/207.1 |
| 2015/0016693 A1* | 1/2015 | Gattuso | 382/18 |
| 2015/0063889 A1* | 3/2015 | Kojima | 399/394 |

* cited by examiner

Primary Examiner — Utpal Shah
(74) Attorney, Agent, or Firm — Dority & Manning, P.A.

(57) ABSTRACT

Systems and methods for the processing of images are provided. In particular, a candidate image can be obtained for processing. The candidate image can have one or more associated image categorization parameters. One or more pixel groups can then be detected in the candidate image and the one or more pixel groups can be associated with semantic data. At least one reference image can then be identified based at least in part on the semantic data of the one or more pixel groups. Once the at least one reference image has been identified, a plurality of adjustment parameters can be determined. One or more pixel groups from the candidate image can then be processed to generate a processed image based at least in part on the plurality of adjustment parameters.

16 Claims, 6 Drawing Sheets

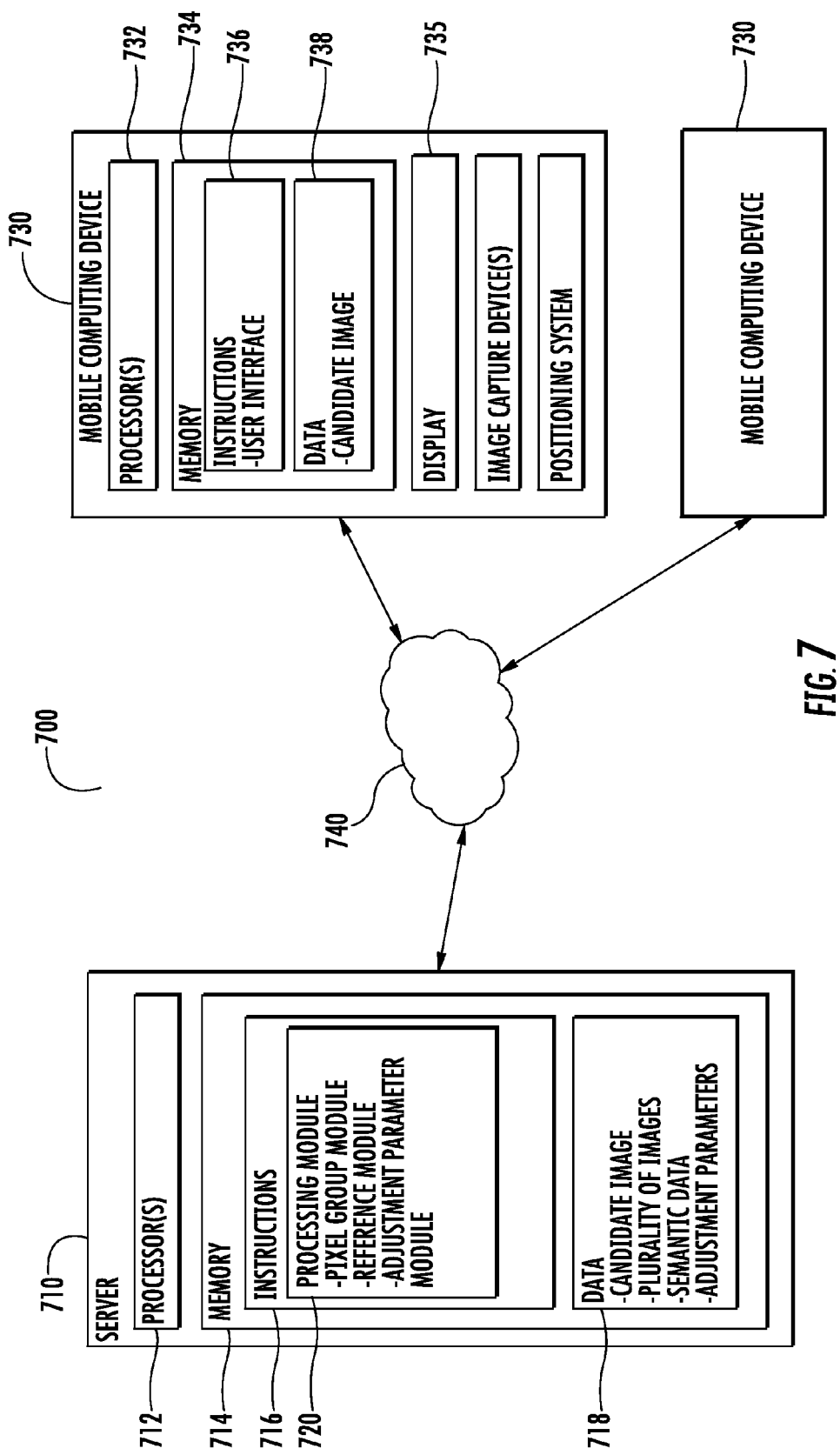

AUTOMATIC PROCESSING OF IMAGES

FIELD

The present disclosure relates generally to image analysis and processing, and more particularly to automatically processing images.

BACKGROUND

Image capture devices, such as those associated with a smartphone or tablet, allow users to capture a digital image and store the image in a memory associated with the image capture device. These image capture devices can also include wireless network capabilities that allow a user to transmit an image to a remote computing device or to access an image from a remote computing device via a wireless network.

These image capture devices can also include various techniques for improving the quality of photos. For instance, image capture devices often allow a user to adjust various settings such as white balance, flash, and/or exposure metering. Further, image capture devices might include technologies such as High Dynamic Range Imaging (HDR). HDR allows for a wider range of dynamics in saturation, brightness and contrast through the use of multiple images captured at different exposures. In addition, image capture devices often have post production software that allow a user to adjust various image controls such as saturation, brightness and contrast, and to apply various filters and/or transforms to the image. Such post production software can include autocorrect filters that adjust saturation, brightness and contrast to some normalized model.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of automatically processing an image. The method includes obtaining, by one or more computing devices, a candidate image. The candidate image is associated with one or more image categorization parameters. The method further includes detecting, by the one or more computing devices, one or more pixel groups in the candidate image. The method further includes associating, by the one or more computing devices, each of the one or more pixel groups in the candidate image with semantic data. The semantic data is determined based at least in part on the one or more image categorization parameters of the candidate image or data indicative of the content of the pixel group. The method further includes receiving, by the one or more computing devices, a plurality of adjustment parameters determined based at least in part on an at least one reference image. The at least one reference image is identified based at least in part on the semantic data of the one or more pixel groups in the candidate image. The method further includes processing the one or more pixel groups in the candidate image based at least in part on the plurality of adjustment parameters to generate a processed image.

Other aspects of the present disclosure are directed to systems, apparatus, tangible, non-transitory computer-readable media, user interfaces and devices for automatically processing an image.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 7 depicts an example computing system according to example embodiments of the present disclosure.

DETAILED DESCRIPTION

Glossary

Figure 1:
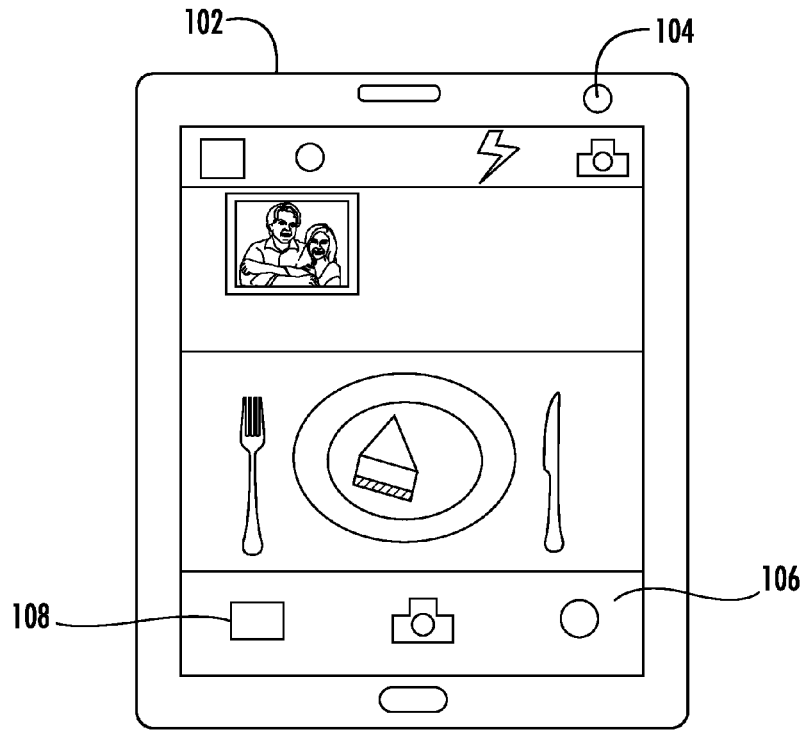
FIG. 1 depicts an example computing device having an image capture device according to example embodiments of the present disclosure.

Image Categorization Parameter: Data associated with the content or context of an image, pixel group and/or a portion thereof. Examples of image categorization parameters include timestamps, geo-location, metadata associated with the image, or automatic image classifiers.

Pixel Group: An image region having pixels belonging to a common entity. Examples of a pixel group include pixels associated with a person, place, object, or scene or portions thereof.

Adjustment Parameter: A parameter specifying one or more characteristics of a processing operation of an image. Examples of adjustment parameters include image controls, image filters or image transforms.

Tainted Image: An image having some quality or characteristic that causes the image to be rejected from use as a reference image. Examples of a tainted image include a creative flash or filter.

Creative Flash: A flash associated with an image giving the image some visual quality or characteristic that differs from how the content of the image is perceived by the human eye.

Creative Filter: A filter associated with an image giving the image some visual quality or characteristic that differs from how the content of the image is perceived by the human eye.

Image Control: A parameter associated with an image that determines a visual characteristic of the image such as but not limited to saturation, brightness or contrast.

Similarity Score: Electronic data indicative of similarity between image categorization parameters of two or more images.

Image Quality Rating: A parameter associated with an image indicative of the degree of quality of the image.

Overview

Reference will now be made in detail to embodiments, one or more examples of which are illustrated in the drawings.

Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Example aspects of the present disclosure are directed to automatically processing an image captured, for instance, by an image capture device. Capturing high quality images can be a difficult task. The photographer can be constrained, for instance, by camera hardware, available lighting, and even the photographer's own ability. In particular, an image capture device associated with a mobile computing device, such as a smartphone, can have difficulty capturing an image having colors and contrast as perceived by the human eye. Image quality can be addressed to some degree using appropriate camera settings such as white balance, flash, exposure metering points, etc. Image quality can further be improved through camera technologies such as high-dynamic-range imaging (HDR), and/or by post production software that allows for adjusting image parameters such as saturation, brightness and contrast, and for the application of various filters or transforms to the image. However, such image processing techniques may not be readily available, or may be too time consuming or difficult for most users to implement.

In light of the unique challenges described above, the disclosed embodiments provide features for the automatic processing of images. Specific algorithms are implemented to adapt images based on a wide range of inputs and sources. In particular, a candidate image can be accessed for processing. At least one reference image can be identified and used to determine a plurality of adjustment parameters. Based on the plurality of adjustment parameters, one or more pixel groups in the candidate image can be processed to generate a processed image. Such implementations can improve the quality of images and can provide a more intelligent, user-friendly image processing technique that is tailored to each individual image.

According to example aspects of the present disclosure, a candidate image captured by an image capture device (e.g. a digital camera) can be obtained. The candidate image can be stored on a mobile computing device associated with a user or can be obtained from an image database. The candidate image can be associated with one or more image categorization parameters. The one or more image categorization parameters can include, for instance, a geo-location of the image, a timestamp, explicit metadata added by the user (e.g. title, description, hashtags), other metadata associated with the image (e.g. comments on a post to which the image is attached), and/or automatic image classifiers.

Once the candidate image has been obtained, one or more pixel groups can be detected in the candidate image. A pixel group can include a portion of the candidate image, or even the entire candidate image. The one or more pixel groups can then be associated with semantic data indicative of the content of the one or more pixel groups. The semantic data can be determined based at least in part on the one or more image categorization parameters of the candidate image and/or data indicative of the content of a pixel group.

Once the semantic data has been associated with the one or more pixel groups, a plurality of adjustment parameters can be received based at least in part on an at least one reference image. The at least one reference image can be identified based at least in part on semantic data of the one or more pixel groups. In particular, a plurality of images can be accessed from an image database. From the plurality of images, at least one reference image can be identified based at least in part on the semantic data of the one or more pixel groups in the candidate image and/or the one or more image categorization parameters of the candidate image.

In an example embodiment, the at least one reference image can be identified based at least in part on similarity scores between one or more image categorization parameters of each image of the plurality of images and the candidate image. In an alternative embodiment, the at least one reference image can be identified based at least in part on image quality. In particular, identifying the at least one reference image can include comparing an image from the plurality of images to an image quality threshold. The image quality threshold can be indicative of a degree of quality that each image of the plurality of images must meet to be identified as a reference image. Once the image quality threshold has been determined, a determination can be made of an image quality rating for each image of the plurality of images. An image quality rating can, for instance, be based at least in part on user feedback ratings associated with an image.

A comparison can then be made between the image quality rating of each image of the plurality of images and the image quality threshold. The images having an image quality rating above the image quality threshold can be identified as a reference image while the images having an image quality rating below the image quality threshold can be rejected. In an example embodiment, tainted reference images can also be rejected from analysis. Tainted images can be images having a quality or characteristic causing the image to be excluded from use as a reference image and can include, for instance, images that result from the use of a creative filter or flash. A creative filter or flash can be a filter or flash associated with an image giving the image some visual quality or characteristic that differs from how the content of the image is perceived by the human eye.

Based at least in part on the identified at least one reference image, a plurality of adjustment parameters can be determined. In particular, the plurality of adjustment parameters can be determined based at least in part on one or more image quality parameters of the at least one reference image. The plurality of adjustment parameters can include, for instance, image controls (e.g. saturation, brightness, contrast, sharpness), and/or various filters or transforms associated with an image. Based at least in part on the received plurality of adjustment parameters, the one or more pixel groups of the candidate image can be processed, such as with post-processing techniques. The post-processing techniques can include, for instance, adapting localized spectra (e.g. RGB, HSV) and applying a normalization process to the one or more pixel groups of the candidate image. The processed image can then be provided for display, for instance, on a mobile computing device.

In a particular implementation, the processed image can be provided to an image database such that the processed image can be identified as a reference image for other candidate images. For instance, the processed image can be accessed as part of a plurality of images and identified as a reference image according to example aspects of the present disclosure.

In another particular implementation, the plurality of adjustment parameters can be determined without the use of identified reference images. In particular, the plurality of adjustment parameters can be determined based on the semantic data associated with the one or more pixel groups. The semantic data can identify attributes associated with the one or more pixel groups, such as, for instance, the color, texture, shape etc. of a particular entity depicted in a pixel group. In a particular embodiment, the semantic data can use automatic image classifiers to identify attributes and/or classification models of a pixel group. For instance, the semantic data, using the image classifiers, can indicate that a plate at a particular restaurant has a particular color. The semantic data can then be used to determine a plurality of adjustment parameters to be applied to the candidate image during processing.

According to one example implementation, a user can capture a candidate image of a piece of tiramisu at the user's favorite restaurant using the digital camera located on the user's smartphone. The candidate image can have associated metadata (e.g. geo-coding) indicating that the image depicts a piece of tiramisu at a particular Trattoria in Boston, Mass. The user can access an application on the user's smartphone. The application can prompt the user to request an improved version of the image. The user can then request an improved image through interaction with the application. Responsive to the user's request, the candidate image can be processed according to example embodiments of the present disclosure and the processed image can be provided to the user.

In alternative implementations, the image can be automatically processed according to example aspects of the present disclosure based on settings input by the user. For instance, a user can adjust settings associated with the application to specify that some or all images captured using the image capture device associated with the user's smartphone are to be processed, if possible, according to example aspects of the present disclosure. In this way, the user can obtained improved images of images captured by the user's device.

Example Image Processing

Referring now to the Figures, example aspects of the present disclosure will now be set forth. FIG. 1 depicts an example mobile computing device 102 according to example embodiments of the present disclosure. Mobile computing device 102 can include an image capture device 104. Image capture device 104 can be a digital camera used to capture images and/or video. Mobile computing device 102 can also include an application in which a user can request an improved image. The application can be used to provide a user interface, such as user interface 106. User interface 106 can display, for instance, a candidate image, various camera parameters, and/or various camera settings. User interface 106 can further display an image improvement option 108. Image improvement option 108 can prompt a user to request an improved version of the candidate image. Accordingly, a user associated with mobile computing device 102, through interaction with image improvement option 108, can request an improved version of a candidate image and responsive to such request, a processed image can be provided according to example aspects of the present disclosure. The processed image can then be provided for display in user interface 106 by mobile computing device 102.

Figure 2:
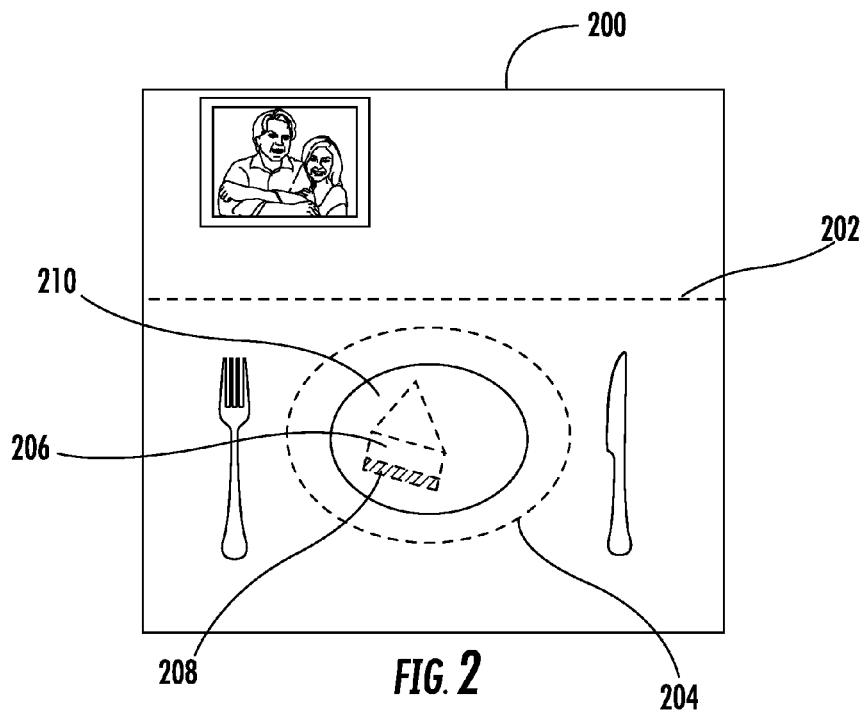
FIG. 2 depicts an example candidate image according to example embodiments of the present disclosure.

In an example embodiment, upon a request from a user for an improved version of a candidate image, one or more pixel groups can be detected in the candidate image. For instance, FIG. 2 depicts an example candidate image 200 in which one or more pixel groups have been detected. Candidate image 200 can be captured by an image capture device associated with a user, such as image capture device 102 in FIG. 1. Candidate image 200 depicts a piece of tiramisu dessert 210 in the context of a restaurant setting. The borders of detected pixel groups in FIG. 2 are illustrated by broken lines. As illustrated, candidate image 200 includes a pixel group 202, which depicts a table and a pixel group 204, which depicts a plate. Tiramisu 210 can be broken up into multiple pixel groups depending on the different colors and/or textures of the tiramisu. For instance pixel group 206 depicts one layer of tiramisu 210 and pixel group 208 depicts another layer. According to example aspects of the present disclosure, once the various pixel groups have been detected in candidate image 200, a plurality of adjustment parameters can be determined. One or more pixel groups in candidate image 200 can then be processed based on the plurality of adjustment parameters to generate a processed image.

Figure 3:
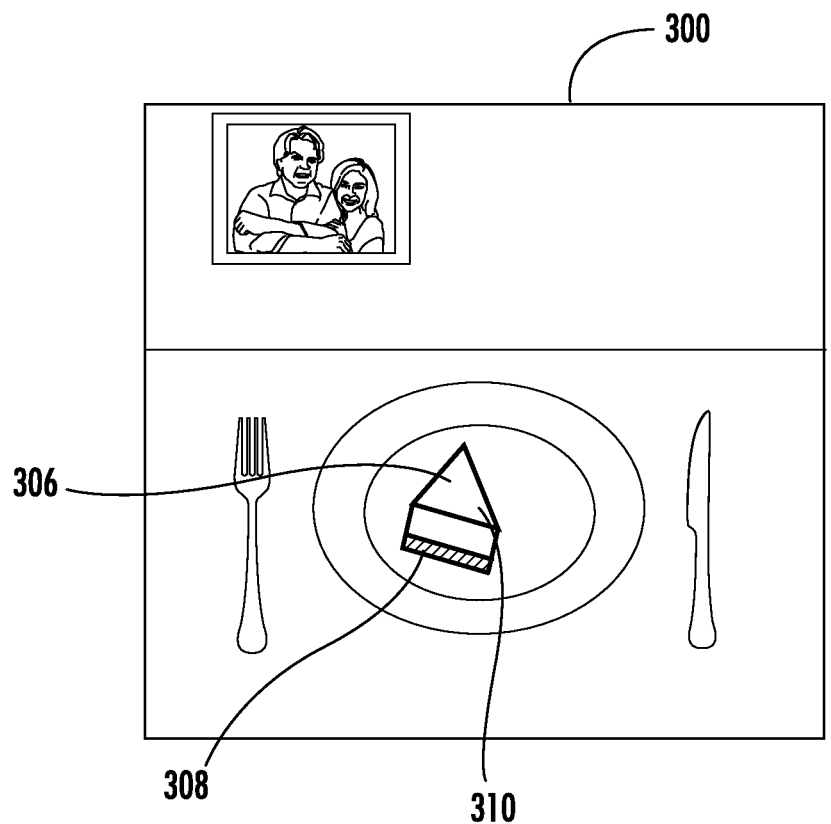
FIG. 3 depicts an example processed image according to example embodiments of the present disclosure.

FIG. 3, for instance, depicts an example processed image 300 according to example embodiments of the present disclosure. In particular, a processed image can depict one or more processed pixel groups that correspond to pixel groups detected in a candidate image. For instance, in FIG. 3, processed image 300 depicts processed pixel groups 308 and 310, which correspond to pixel groups 208 and 210 of candidate image 200, respectively. Processed pixel groups are illustrated in FIG. 3 by heavier line weights, such as the heavier line weights of tiramisu 310. Processed pixel groups 308 and 310 can be processed using different adjustment parameters as appropriate for each individual pixel group. Although processed image 300 depicts only two processed pixel groups, it will be appreciated by those skilled in the art that any number of pixel groups detected in candidate image 200 can be processed according to example embodiments of the present disclosure.

Example Methods for Processing Images

Figure 4:
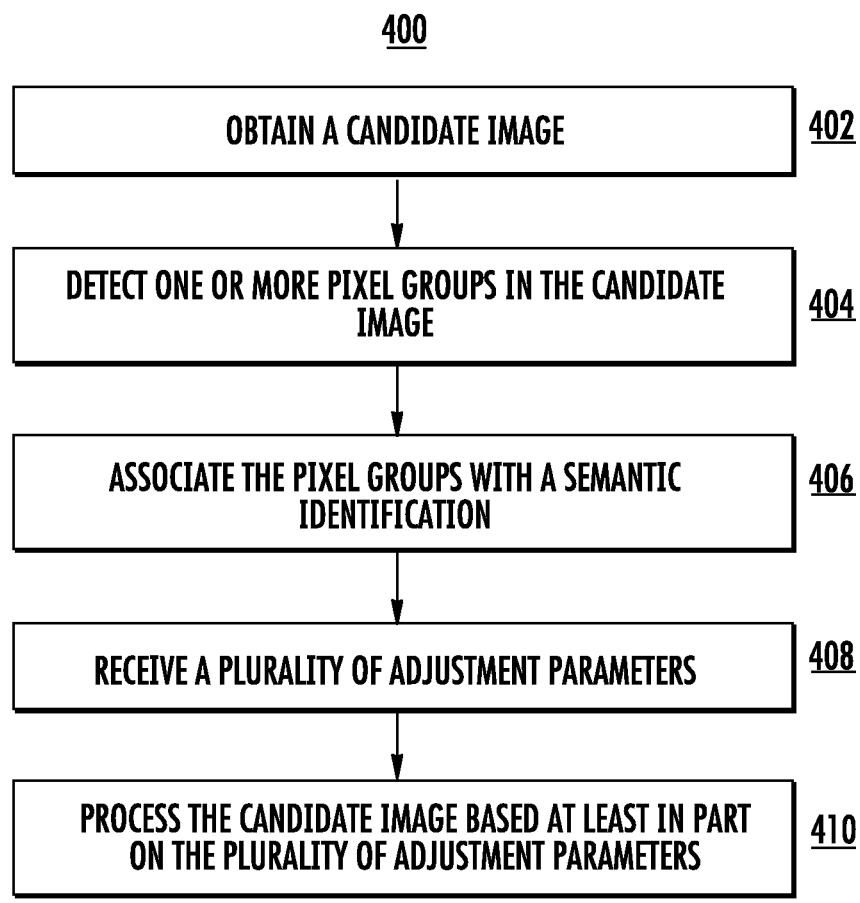
FIG. 4 depicts a flow diagram of an example method for automatically processing an image according to example embodiments of the present disclosure.

FIG. 4 depicts an example method (400) for automatically processing an image according to example embodiments of the present disclosure. Method (400) can be implemented by one or more computing devices, such as one or more of the computing devices depicted in FIG. 6. In addition, FIG. 4 depicts steps performed in a particular order for purposes of illustration and discussion. Those of ordinary skill in the art, using the disclosures provided herein, will understand that the various steps of any of the methods disclosed herein can be omitted, adapted, modified, rearranged, or expanded in various ways without deviating from the scope of the present disclosure.

At (402), method 400 can include obtaining a candidate image. The candidate image can be captured by an image capture device and can be a still image or a moving image such as a video or movie. The image capture device can be associated with, for instance, a mobile computing device, such as a smartphone or tablet. The candidate image can have one or more associated image categorization parameters. The one or more image categorization parameters can relate to the content or context of the image. The one or more image categorization parameters can include, for instance, a location of the image, a timestamp indicating when the image was taken, explicit metadata added by the user (e.g. title, description, hashtags), other metadata associated with the image (e.g. comments on a post to which the image is attached), and/or automatic image classifiers.

The candidate image can also have one or more associated image quality parameters. The one or more image quality parameters can relate to visual characteristics of the image. For instance, the one or more image quality parameters can relate to color, texture, and/or other visual characteristics of an image, and can include image controls and/or various filters or transforms associated with the image. The image quality parameters can also indicate whether the image was captured using a flash.

At (404), method (400) can include detecting one or more pixel groups in the candidate image. A pixel group can be an image region having pixels belonging to a common entity, such as but not limited to a common person, place, object, or scene or portions thereof. A pixel group can overlap spatially with another pixel group. For instance, a portion of an image that is included in one pixel group can also be included in another pixel group according to example aspects of the present disclosure. Pixel groups can separate various regions of an image and can be detected, for instance, through edge detection and/or local classification technologies. In particular, pixel groups can be detected that separate various entities in an image, such as a table or a dinner plate. Pixel groups can further be detected that separate various portions of a single entity. For instance, a piece of tiramisu dessert can be separated into multiple pixel groups based at least in part on the different colors and/or textures of the tiramisu.

At (406), method (400) can include associating the one or more pixel groups with semantic data. The sematic data can be determined based at least in part on the one or more image categorization parameters of the candidate image. Semantic data can be data describing an entity associated with a pixel group, and can comprise, for instance, a semantic label. A semantic label can include data indicative of the content of a pixel group. It will be appreciated by those skilled in the art that the association of the one or more pixel groups with semantic data can be performed by a user or a computing device utilizing, for instance, automatic image classifiers.

At (408), method (400) includes receiving a plurality of adjustment parameters based at least in part on an at least one reference image. In particular, a plurality of images can be accessed and the at least one reference image can be identified from the plurality of images based on semantic data of the one or more pixel groups in the candidate image. The at least one reference image can be identified, for instance, based at least in part on a similarity score. A similarity score can be indicative of an amount of similarity between images and can be determined through a comparison of image categorization parameters and semantic data associated with the candidate image and image categorization parameters of an image from the plurality of images. As described above, image categorization parameters can comprise data associated with the content or context of an image. By analyzing and comparing image categorization parameters of an image from the plurality of images to image categorization parameters and semantic data of the candidate image, a similarity score between the images can be determined. A similarity score can be determined for each image in the plurality of images. Any image in the plurality of images that has a similarity score higher than some similarity threshold can be identified as a reference image.

The plurality of adjustment parameters can be determined based at least in part on the at least one reference image. In particular, the plurality of adjustment parameters can be determined based at least in part on one or more image quality parameters associated with the at least one reference image. Each identified reference image can have one or more associated image quality parameters. The one or more image quality parameters can relate to visual characteristics of the image. For instance, the one or more image quality parameters can relate to color, texture, and/or other visual characteristics of an image, and can include image controls and/or various filters or transforms associated with a reference image. The plurality of adjustment parameters can be determined based at least in part on the image quality parameters of the at least one reference image and can be applied to the candidate image during processing, as in (408) of method (400), which is described below in more detail.

In an alternative embodiment, the adjustment parameters can be determined through an analysis of the one or more image quality parameters of some combination of the at least one reference image. For example, the adjustment parameters can be determined based on an analysis of the subset of reference images that are most similar to the candidate image, or the subset of reference images that have the highest quality ratings.

Figure 5:
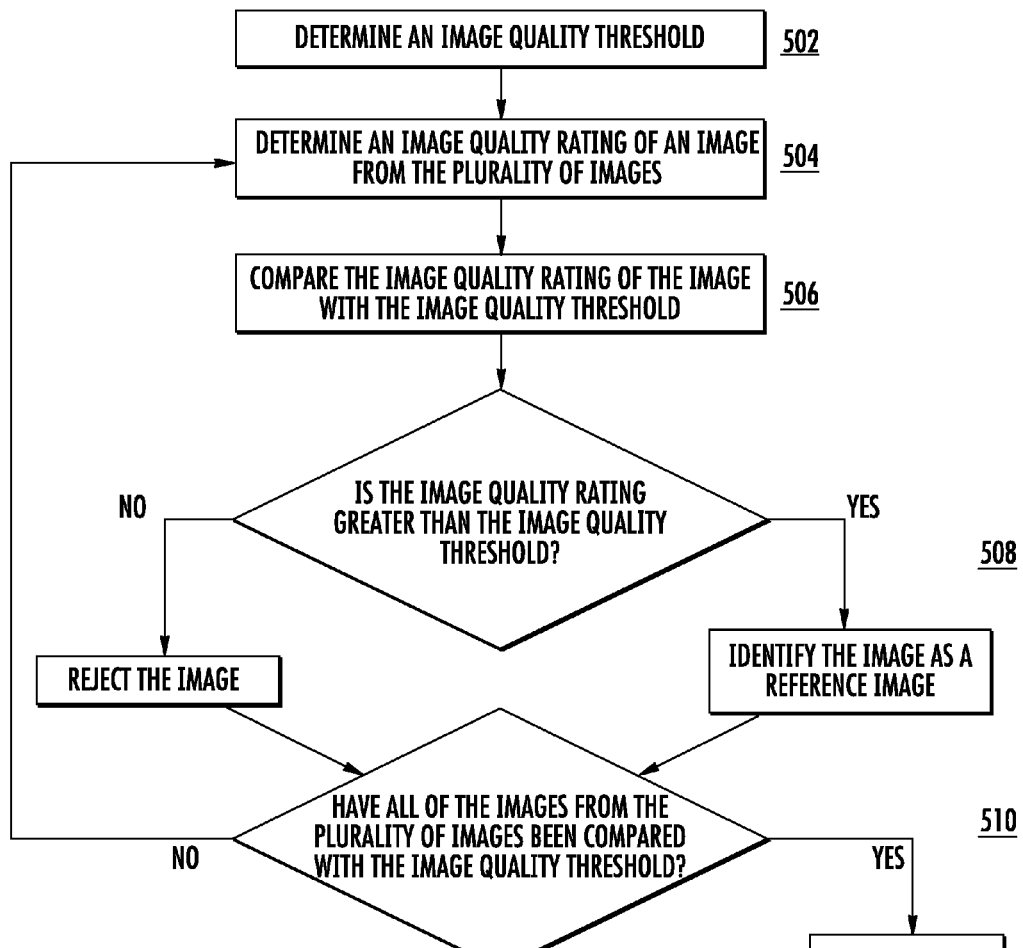
FIG. 5 depicts a flow diagram of an example method for identifying a reference image according to example embodiments of the present disclosure.

In another alternative embodiment the at least one reference image can be identified based at least in part on image quality. For instance, FIG. 5 depicts a flow diagram of an example method (500) for identifying at least one reference image. An image from the plurality of images may not be identified as a reference image if it does not meet a certain standard of quality. For instance, an image can be rejected if it is blurred, or has poor lighting. Such images may not be identified as an at least one reference image and subsequently will be excluded from analysis when determining adjustment parameters.

Accordingly, at (502), method (500) includes identifying an image quality threshold. An image quality threshold can be a signal used in determining whether an image is of a high enough quality to be utilized as a reference image. The image quality threshold can be indicative of a baseline degree of quality that an image is required to meet to be identified as a reference image. In particular, the image quality threshold can be based on a score determined as a function of various image parameters, such as sharpness, blurred pixels, lighting, comparison to true colors, and/or any other suitable image parameters.

At (504), method (500) can include determining an image quality rating for an image from the plurality of images. An image quality rating can be indicative of the degree of quality of an image. For instance, the image quality rating can be based on a score determined as a function of various image parameters, such as sharpness, blurred pixels, lighting, comparison to true color, etc. In one embodiment, the image quality rating can be determined based at least in part on user feedback ratings associated with the image.

At (506), method (500) can include comparing the image quality rating of the image with the image quality threshold. At (508), method (500) can include determining whether to identify the image as a reference image. If the image quality rating of the image is greater than the image quality threshold, the image can be identified as a reference image, but if the image quality rating of the image is less than the image quality threshold, the image can be rejected. Rejected images can be excluded from the analysis when determining adjustment parameters.

At (510), method (500) can include determining whether all of the images from the plurality of images have been compared against the image quality threshold. If at least one image from the plurality of images has yet to be compared against the image quality threshold, method (500) can include returning to (504). If the entire plurality of images has been compared against the image quality threshold, method (500) can end. A plurality of adjustment parameters can then be determined as in (408) of method (400), as described above.

Referring back to FIG. 4, at (410), method (400) can include processing the one or more pixel groups of the candidate image based at least in part on the plurality of adjustment parameters. More particularly, image quality parameters of the one or more pixel groups of candidate image can be adjusted based at least in part on the plurality of adjustment parameters. Different adjustment parameters can be determined independently for each different pixel group. The processing can include, for instance, adapting localized spectra (e.g. RGB, HSV) and applying a normalization process to the one or more pixel groups of the candidate image. The normalization process can be based at least in part on the plurality of adjustment parameters.

Figure 6:
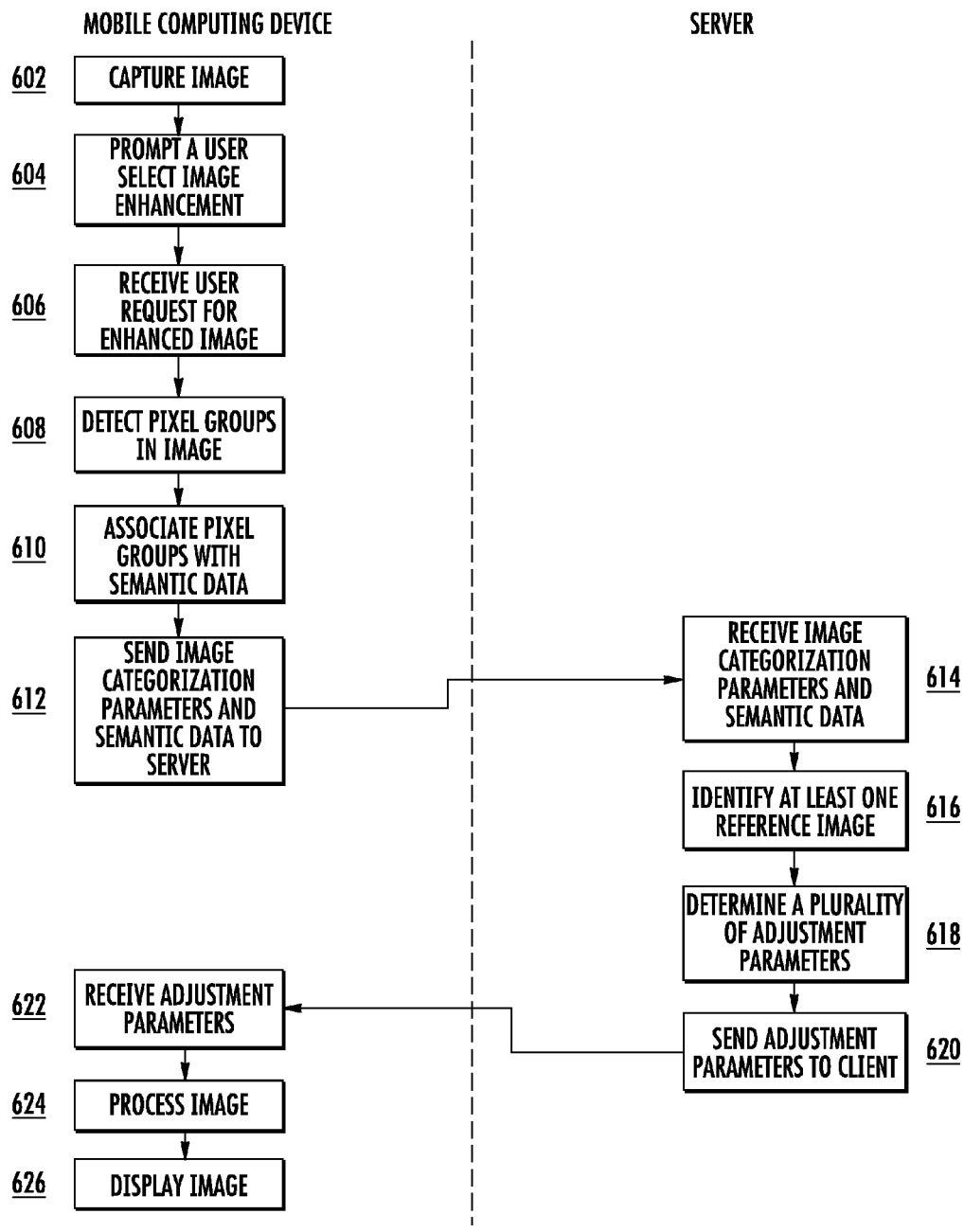
FIG. 6 depicts a flow diagram of an example client-server implementation according to example embodiments of the present disclosure.

FIG. 6 depicts an example flow diagram of a client-server interaction for implementing the systems and methods of the present disclosure according to example embodiments of the present disclosure. The client-server interaction can be implemented, for instance, by the computing system of FIG. 7. However, it will be appreciated by those skilled in the art that the systems and methods of the present disclosure can be implemented through various other interactions and by various other suitable computing systems, such as, for instance, a single computing device.

At (602), a mobile computing device can capture a candidate image. The candidate image can be associated with various image categorization parameters according to example embodiments of the present disclosure. At (604), the mobile computing device can prompt a user to select an image enhancement option. At (606), the mobile computing device can receive a user request for an enhanced image. At (608), the mobile computing device can associate the detected pixel groups with semantic data. At (610), the mobile computing device can send the image categorization parameters and semantic data to a server.

At (612), the server can receive the image categorization parameters and semantic data. At (614), the server can identify at least one reference image based at least in part on the image categorization parameters and semantic data. At (616), the server can determine a plurality of adjustment parameters based at least in part on the at least one reference image. At (618), the server can send the plurality of adjustment parameters to the mobile computing device.

At (620), the mobile computing device can receive the plurality of adjustment parameters. At (622), the mobile computing device can process the candidate image based at least in part on the plurality of adjustment parameters. At (624), the mobile computing device can display the processed image.

Example Computing Systems for Processing Images

FIG. 7 depicts an example computing system 700 that can be used to implement the methods and systems according to example aspects of the present disclosure. The system 700 can be implemented using a client-server architecture that includes a server 710 that communicates with one or more mobile computing devices 730 over a network 740. The system 700 can be implemented using other suitable architectures, such as a single computing device.

The system 700 includes a server 710, such as a web server. The server 710 can host a geographic information system. The server 710 can be implemented using any suitable computing device(s). The server 710 can have one or more processors 712 and memory 714. The server 710 can also include a network interface used to communicate with one or more mobile computing devices 730 over network 740. The network interface can include any suitable components for interfacing with one or more networks, including for example, transmitters, receivers, ports, controllers, antennas, or other suitable components.

The one or more processors 712 can include any suitable processing device, such as a microprocessor, microcontroller, integrated circuit, logic device, or other suitable processing device. The memory 714 can include any one or more computer-readable media, including, but not limited to, non-transitory computer-readable media, RAM, ROM, hard drives, flash drives, or other memory devices. The memory 714 can store information accessible by the one or more processors 712, including computer-readable instructions 716 that can be executed by the one or more processors 712. The instructions 716 can be any set of instructions that when executed by the one or more processors 712, cause the one or more processors 712 to perform operations. For instance, the instructions 716 can be executed by the one or more processors 712 to implement one or more modules configured to implement a processing module 720 and/or various aspects of any of the methods disclosed herein.

The processing module 720 can be configured to process a candidate image according to example embodiments of the present disclosure. The processing module 720 can include one or more modules, such as a pixel group module, adjustment parameter module and/or a reference module. The pixel group module can be configured to detect one or more pixel groups in a candidate image and associate each pixel groups with semantic data. The reference module can be configured to identify at least one reference image, such as according to the method depicted in FIG. 5. The adjustment parameter module can be configured to determine a plurality of adjustment parameters based at least in part on the at least one reference image.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or, optical or magnetic media. When software is used, any suitable programming language or platform can be used to implement the module.

Memory 714 can also include data 718 that can be retrieved, manipulated, created, or stored by the one or more processors 712. The data 718 can include, for instance, a candidate image, a plurality of images, semantic data, adjustment parameters and other information. The data 718 can be stored in one or more databases. The one or more databases can be connected to the server 710 by a high bandwidth LAN or WAN, or can also be connected to server 710 through network 740. The one or more databases can be split up so that they are located in multiple locales.

The server 710 can exchange data with one or more mobile computing devices 730 over the network 740. Although two mobile computing devices 730 are illustrated in FIG. 7, any number of mobile computing devices 730 can be connected to the server 710 over the network 740. Each of the mobile computing devices 730 can be any suitable type of computing device, such as a general purpose computer, special purpose computer, laptop, desktop, mobile device, smartphone, tablet, wearable computing device, a display with one or more processors, or other suitable computing device.

Similar to the server 710, a mobile computing device 730 can include one or more processor(s) 732 and a memory 734. The one or more processor(s) 732 can include one or more central processing units (CPUs), graphics processing units (GPUs) dedicated to efficiently rendering images, an/or other processing devices. The memory 734 can include one or more computer-readable media and can store information accessible by the one or more processors 732, including instructions 736 that can be executed by the one or more processors 732 and data 738. For instance, the memory 734 can store instructions 736 for implementing a user interface module for the facilitation of image capture.

The mobile computing device 730 of FIG. 7 can include various input/output devices for providing information to and receiving information from a user, such as a touch screen, touch pad, data entry keys, speakers, and/or a microphone suitable for voice recognition. For instance, the mobile computing device 730 can have a display 735 for presenting imagery to a user, and one or more image capture devices 737 for capturing images.

The mobile computing device 730 can further include a positioning system. The positioning system can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The mobile computing device 730 can also include a network interface used to communicate with one or more remote computing devices (e.g. server 710) over the network 740. The network interface can include any suitable components for interfacing with one or more networks, including for example, transmitters, receivers, ports, controllers, antennas, or other suitable components.

The network can be any type of communication network, such as local area network (e.g. intranet), wide area network (e.g. Internet), cellular network, or some combination thereof. The network 740 can also include a direct connection between a mobile computing device 730 and the server 710. In general, communication between the server 710 and a mobile computing device 730 can be carried via network interface using any type of wired and/or wireless connection, using a variety of communication protocols (e.g. TCP/ICP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for automatically processing an image, the method comprising:
    obtaining, by one or more computing devices, a candidate image, the candidate image associated with one or more image categorization parameters;
    detecting, by the one or more computing devices, one or more pixel groups in the candidate image;
    associating, by the one or more computing devices, each of the one or more pixel groups in the candidate image with semantic data determined based at least in part on the one or more image categorization parameters of the candidate image or data indicative of the content of the pixel group;
    receiving, by the one or more computing devices, a plurality of adjustment parameters determined based at least in part on an at least one reference image, the at least one reference image being identified based at least in part on the semantic data of the one or more pixel groups in the candidate image, and further based at least in part on a comparison against an image quality rating, the image quality rating being determined at least in part from user feedback associated with the reference image; and
    processing, by the one or more computing devices, the one or more pixel groups in the candidate image based at least in part on the plurality of adjustment parameters to generate a processed image.

2. The computer-implemented method of claim 1, wherein the one or more image categorization parameters comprises metadata associated with an image.

3. The computer-implemented method of claim 1, wherein the one or more image categorization parameters comprises a geographical location associated with an image.

4. The computer-implemented method of claim 1, wherein the at least one reference image is identified from a plurality of images.

5. The computer-implemented method of claim 4, wherein the at least one reference image is identified as a reference image based at least in part on a similarity score, the similarity score indicative of similarity between one or more image categorization parameters of an image from the plurality of images and the one or more image categorization parameters of the candidate image.

6. The computer-implemented method of claim 4, wherein the processed image is added to the plurality of images.

7. The computer-implemented method of claim 4, further comprising rejecting, by the one or more computing devices, at least one tainted image.

8. The computer-implemented method of claim 7, wherein the at least one tainted image comprises an image resulting from a creative flash.

9. The computer-implemented method of claim 7, wherein the at least one tainted image comprises an image resulting from a creative filter.

10. The computer-implemented method of claim 1, wherein the plurality of adjustment parameters comprises image controls.

11. The computer-implemented method of claim 1, wherein processing the candidate image comprises applying a normalization process to the candidate image.

12. The computer implemented method of claim 1, further comprising:

prompting, by the one or more computing devices, a user to select an image improvement option for the candidate image;

receiving, by the one or more computing devices, a request from the user to process the candidate image; and responsive to the request, providing, by the one or more computing devices the processed image to the user.

13. A computing system comprising:

one or more processors; and one or more computer-readable media storing computer-readable instructions that when executed by the one or more processors cause the one or more processors to perform operations, the operations comprising:

obtaining a candidate image, the candidate image associated with one or more image categorization parameters;

detecting one or more pixel groups in the candidate image;

associating each of the one or more pixel groups in the candidate image with semantic data based at least in part on the one or more image categorization parameters of the candidate image or data indicative of the content of the pixel group;

receiving a plurality of adjustment parameters based at least in part on an at least one reference image, the at least one reference image being identified based at least in part on the semantic data of the one or more pixel groups in the candidate image and further based at least in part on a comparison against an image quality rating, the image quality rating being determined at least in part from user feedback associated with the reference image; and processing the one or more pixel groups in the candidate image based at least in part on the plurality of adjustment parameters to generate a processed image.

14. The computing system of claim 13, wherein the one or more image categorization parameters comprises metadata associated with an image.

15. One or more non-transitory computer-readable media storing computer-readable instructions that when executed by one or more processors cause the one or more processors to perform operations, the operations comprising:

obtaining a candidate image, the candidate image associated with one or more image categorization parameters;

detecting one or more pixel groups in the candidate image; associating each of the one or more pixel groups in the candidate image with semantic data based at least in part on the one or more image categorization parameters of the candidate image;

receiving a plurality of adjustment parameters determined based at least in part on an at least one reference image, the at least one reference image being identified based at least in part on the semantic data of the one or more pixel groups in the candidate image and further based at least in part on a comparison against an image quality rating, the image quality rating being determined at least in part from user feedback associated with the reference image; and processing the one or more pixel groups in the candidate image based at least in part on the plurality of adjustment parameters to generate a processed image.

16. The one or more non-transitory computer-readable media of claim 15, wherein the at least one reference image is identified as a reference image based at least in part on a similarity score, the similarity score indicative of similarity between one or more image categorization parameters of an image from the plurality of images and the one or more image categorization parameters of the candidate image.

* * * * *